UNITED STATES PATENT OFFICE.

OSKAR BRUNO THIEME, OF POTSDAM, GERMANY.

METHOD FOR PRODUCING CELLULOID-LIKE SUBSTANCES.

No. 831,488.  Specification of Letters Patent.  Patented Sept. 18, 1906.

Application filed April 10, 1906. Serial No. 310,982.

*To all whom it may concern:*

Be it known that I, OSKAR BRUNO THIEME, a subject of the King of Prussia, German Emperor, residing at Potsdam, in the Kingdom of Prussia, Germany, have invented new and useful Improvements in the Methods for Producing Celluloid - Like Substances, of which the following is a specification.

My invention relates to an improved method and means for producing celluloid-like substances; and the object of my invention is to obtain a celluloid-like material of specific, advantageous, and essential qualities by using as a substitute for camphor—*i. e.*, for the gelatinizing of the nitrocellulose—completely-substituted ureas—viz., ureas in which the four hydrogen atoms of the ammonia residues are substituted by organic radicals—and by differently adapting such ureas to their various gelatinizing purposes or to the requisite qualities of the celluloid-like substances, which are manufactured according to my new method. Considerable advantages are realized by the latter over other methods, which are all based on the use of various organic substances susceptible of gelatinizing nitrocellulose, thus forming substitutes for camphor, which, as it is known, is generally used in celluloid manufacture as gelatinizing agent for nitrocellulose. However, attention must be called to the fact that it is insufficient to have a substance of mere available gelatinizing efficiency. There are numerous further conditions to which an ideal camphor surrogate must answer in celluloid-making. As it was impossible till now to discover a rigorous relation between the chemical constitution of the gelatinizing medium and its gelatinizing efficiency or its fitness for forming with nitrocellulose a well-conditioned celluloid, all investigations to that effect have necessarily been limited in general to pure empiric method. Essentially differing from the incompletely substituted ureas—as, for instance, from diphenyl-urea not having any gelatinizing effect upon nitrocellulose—the said completely-substituted ureas used for celluloid-making according to my discovery exercise an eminent gelatinizing effect upon collodion cotton, producing, with or without addition of camphor and by the usual working operations, tough and not brittle celluloid. The important advantages which are realized by the greater part of the completely - substituted ureas, when compared with camphor are in general, the following: The manufacture of inodorous celluloid is made possible by the use of the said ureas, allowing at the same time such determination of the qualities of the celluloid that the working and shaping processes may be effected and finished at any desirable temperature, because the tetra-substituted ureas can be produced of considerably differing melting-points. Thus, for instance, the melting temperature of the asymmetric diethyldiphenyl-urea is 54° centigrade, while symmetric diethyldiphenyl-urea liquefies at 79° centigrade and tetraphenyl-urea at 183° centigrade. By conveniently selecting the ureas or by mixing the same with other substances full liberty is afforded for varying the melting-point, so that the temperature at which the celluloid articles are shaped by pressure can be modified in accordance. It appears that such possibility to regulate the molding temperature may be of great advantage, and it will suffice to refer to the most important fact that the degree of temperature which must be applied in manufacturing the celluloid is of great influence upon the stability of the nitrocellulose and also of the goods made of celluloid.

Carrying into practice my new method, the improved celluloid is made in such a manner that in case of using, for instance, diethyldiphenyl-urea the nitrocellulose is triturated with about half its weight of urea, the same rollers and presses being used which are generally used in the celluloid industry when celluloid is made with camphor. In certain cases the addition of camphor has been found rational for the process of gelatinizing.

Having thus described my invention, what I claim as new, and desire to secure by Letters Patent, is—

A method for producing celluloid-like substances which consists in wholly or partly substituting the camphor hitherto used as gelatinizing medium by ureas in which the hydrogen associated with the nitrogen is substituted by organic radicals.

In testimony whereof I have signed my name to this specification in the presence of two subscribing witnesses.

OSKAR BRUNO THIEME.

Witnesses:
  HENRY HASPER,
  WOLDEMAR HAUPT.